United States Patent
Yu et al.

(10) Patent No.: US 10,701,612 B2
(45) Date of Patent: Jun. 30, 2020

(54) NETWORK SEARCH METHOD AND TERMINAL DEVICE

(71) Applicant: HUAWEI TECHNOLOGIES CO., LTD., Shenzhen, Guangdong (CN)

(72) Inventors: Hsiu Yu, Shenzhen (CN); Chengsheng Huang, Taipei (TW); Haw-Wei Shu, Shanghai (CN); Yifang Chang, Taipei (TW)

(73) Assignee: Huawei Technologies Co., Ltd., Shenzhen (CN)

(*) Notice: Subject to any disclaimer, the term of this patent is extended or adjusted under 35 U.S.C. 154(b) by 51 days.

(21) Appl. No.: 16/099,407

(22) PCT Filed: May 6, 2016

(86) PCT No.: PCT/CN2016/081290
§ 371 (c)(1),
(2) Date: Nov. 6, 2018

(87) PCT Pub. No.: WO2017/190349
PCT Pub. Date: Nov. 9, 2017

(65) Prior Publication Data
US 2019/0159101 A1    May 23, 2019

(51) Int. Cl.
*H04W 36/32* (2009.01)
*H04W 48/18* (2009.01)
(Continued)

(52) U.S. Cl.
CPC .......... *H04W 36/32* (2013.01); *H04W 8/183* (2013.01); *H04W 48/16* (2013.01); *H04W 48/18* (2013.01); *H04W 84/042* (2013.01)

(58) Field of Classification Search
CPC ..... H04W 8/183; H04W 36/32; H04W 48/16; H04W 48/18; H04W 84/042
See application file for complete search history.

(56) References Cited

U.S. PATENT DOCUMENTS

| 5,839,069 A | 11/1998 | Keshavachar et al. |
| 7,092,716 B2 * | 8/2006 | Nizri ............ H04W 60/04 370/280 |

(Continued)

FOREIGN PATENT DOCUMENTS

| CN | 101204113 A | 6/2008 |
| CN | 103188767 A | 7/2013 |

(Continued)

OTHER PUBLICATIONS

3GPP TS 23.122 V13.4.0,3rd Generation Partnership Project;Technical Specification Group Core Network and Terminals;Non-Access-Stratum (NAS) functions related to Mobile Station (MS) in idle mode(Release 13), Mar. 2016. total 49 pages.

(Continued)

*Primary Examiner* — Asad M Nawaz
*Assistant Examiner* — Thomas R Cairns
(74) *Attorney, Agent, or Firm* — Fish & Richardson P.C.

(57) ABSTRACT

Embodiments of this application disclose a network search method and a terminal device. The network search method is applied to a terminal device, and a subscriber identity module SIM card is installed in the terminal device. The method part in the embodiments of this application includes: when the terminal device camps on a visited public land mobile network VPLMN, determining an MCC home area corresponding to the SIM card; determining whether the terminal device has entered the MCC home area or is to enter the MCC home area; and triggering a network search if the terminal device has entered the MCC home area or is to enter the MCC home area. The embodiments of this application also disclose the terminal device, so as to increase a speed of going back, by the terminal device, from the VPLMN network to camp on an HPLMN network.

8 Claims, 6 Drawing Sheets

(51) Int. Cl.
*H04W 8/18* (2009.01)
*H04W 48/16* (2009.01)
*H04W 84/04* (2009.01)

(56) References Cited

U.S. PATENT DOCUMENTS

| | | | | |
|---|---|---|---|---|
| 8,175,592 | B2* | 5/2012 | Nayak | H04W 48/16 |
| | | | | 455/414.2 |
| 8,989,734 | B2* | 3/2015 | Ekici | H04W 48/18 |
| | | | | 455/432.1 |
| 9,277,492 | B2* | 3/2016 | Juang | H04W 48/18 |
| 9,730,147 | B2* | 8/2017 | Wirtanen | H04W 48/18 |
| 2012/0083268 | A1* | 4/2012 | Lung | H04W 48/16 |
| | | | | 455/434 |
| 2012/0282924 | A1 | 11/2012 | Tagg et al. | |
| 2014/0031033 | A1 | 1/2014 | Juang et al. | |

FOREIGN PATENT DOCUMENTS

| | | | |
|---|---|---|---|
| CN | 105530621 | A | 4/2016 |
| CN | 105554851 | A | 5/2016 |
| EP | 1881725 | B1 | 6/2011 |
| EP | 2641425 | B1 | 9/2013 |
| EP | 1908324 | B1 | 3/2015 |
| EP | 2863685 | B1 | 9/2017 |
| EP | 2793493 | A2 | 2/2019 |
| EP | 1739991 | B1 | 10/2019 |
| JP | 2006311558 | A | 11/2006 |
| JP | 2007013988 | A | 1/2007 |
| KR | 20040074388 | A | 8/2004 |
| KR | 20130017080 | A | 2/2013 |
| WO | 2007002524 | A1 | 1/2007 |
| WO | 2015065441 | A1 | 5/2015 |
| WO | 2015154789 | A1 | 10/2015 |

OTHER PUBLICATIONS

International Search Report and Written Opinion issued in International Application No. PCT/CN2016/081290 dated Jan. 25, 2017, 17 pages.
Communication Pursuant to Rule 164(1) EPC issued in European Application No. 16900871.1 dated Dec. 14, 2018, 14 pages.
Office Action issued in Korean Application No. 2018-7034761 dated Jan. 15, 2020, 9 pages (with English translation).
Office Action issued in Japanese Application No. 2018-558205 on Sep. 24, 2019, 7 pages (with English translation).
Extended European Search Report issued in European Application No. 16900871.1 dated Apr. 8, 2019, 15 pages.
Office Action issued in Chinese Application No. 201680025160.9 dated Apr. 3, 2019, 12 pages.

* cited by examiner

NETWORK SEARCH METHOD AND TERMINAL DEVICE

CROSS-REFERENCE TO RELATED APPLICATIONS

This application is a National Stage of International Application No. PCT/CN2016/081290, filed on May 6, 2016, which is hereby incorporated by reference in its entirety.

TECHNICAL FIELD

This application relates to the field of mobile communications, and in particular, to a network search method and a terminal device.

BACKGROUND

A public land mobile network (English full name: Public Land Mobile Network, PLMN for short) is a network providing mobile communications services to the public by a government-authorized operator. When a terminal device is currently in a network different from a home public land mobile network (English full name: Home PLMN, HPLMN for short), the terminal device is in a roaming state and roams in a visited public land mobile network (English full name: Visited PLMN, VPLMN for short).

According to stipulations of 3GPP TS23.122, in general cases, a terminal device needs to run on an HPLMN or on an equivalent home public land mobile network (English full name: Equivalent HPLMN, EHPLMN for short) defined in a subscriber identity module (English full name: Subscriber Identity Module, SIM for short) card. After leaving a coverage area of the HPLMN or EHPLMN, the terminal device may choose to camp on a VPLMN.

To provide uninterrupted mobile communications services to users, different operators deploy base stations in areas including border areas on a large scale. Coverage areas of base stations on both sides of a border usually overlap. When located in the border area, the terminal device may receive signals sent from multiple PLMN base stations. When a coverage rate of an HPLMN operator of the terminal device on a regional border is lower than that of a VPLMN operator of the terminal device on the regional border, the terminal device located in an area belonging to the HPLMN may often camp on the VPLMN.

According to the stipulations of 3GPP TS 23.122, to prevent the terminal device from staying on the VPLMN for a long time, the terminal device probably returns to an HPLMN network from a VPLMN network only in two scenarios: The terminal device is disconnected from the VPLMN, or a higher priority PLMN search timer (High priority PLMN search timer) expires. The higher priority PLMN search timer exists in a higher priority PLMN search period EF-HPPLMN field of the SIM card. That is, when the terminal device is disconnected from the VPLMN, an ordinary network search is performed; or when duration of the higher priority PLMN search timer exceeds a preset value, a higher priority PLMN search is performed. In actual application, however, for example, in an HPLMN border area with a densely deployed VPLMN, it is not easy for the terminal device camping on the VPLMN to disconnect from the VPLMN. The higher priority PLMN search timer is stipulated in the 3rd Generation Partnership Project (English full name: 3rd Generation Partnership Project, 3GPP for short) TS 23.122. The duration of the higher priority PLMN search timer is set in the higher priority PLMN search period EF-HPPLMN field of the SIM card. The duration of the higher priority PLMN search timer ranges from 6 minutes to 8 hours in 6-minute steps, and specific duration of the timer is related to a value of the EF-HPPLMN field. For example, when the value of the EF-HPPLMN field is 0, it indicates that the higher priority PLMN search timer is not set; when the value of the EF-HPPLMN field is 1, timing duration of the higher priority PLMN search timer is 6 minutes; when the value of the field is 2, it indicates that the timing duration of the higher priority PLMN search timer is 12 minutes; and so on. If the EF-HPPLMN field of the SIM card has no value, the timing duration of the higher priority PLMN search timer is set to 60 minutes by default. That is, minimum timing duration of the higher priority PLMN search timer is 6 minutes.

As a result, if the higher priority PLMN search is performed only when the higher priority PLMN search timer expires, the terminal device is very likely to camp on the VPLMN network for a long time, that is, the terminal device goes back from the VPLMN network at a relatively slow speed to camp on the HPLMN network.

SUMMARY

Embodiments of this application provide a network search method and a terminal device, so as to effectively avoid camping on a VPLMN network for a long time, that is, increase a speed of going back, by a terminal device, from a VPLMN network to camp on an HPLMN network.

In view of this, a first aspect of this application provides a network search method, where the network search method is applied to a terminal device, a SIM card is installed in the terminal device, and the method includes: when the terminal device camps on a visited public land mobile network VPLMN, determining a mobile country code MCC home area corresponding to the SIM card; determining whether the terminal device has entered the MCC home area or is to enter the MCC home area; and triggering a network search if the terminal device has entered the MCC home area or is to enter the MCC home area.

That is, provided that the terminal device determines that the terminal device has entered the MCC home area, the network search is triggered. Compared with the prior art, in this application, when the terminal device camps on the VPLMN network, the network search is triggered provided that the terminal device determines that the terminal device has entered the MCC home area, that is, an MCC belonging area. When the terminal device is in a coverage area of an HPLMN network, the terminal device may, after triggering the search, immediately go back from the VPLMN network to camp on the HPLMN network. This can resolve a problem that the terminal device camps on the VPLMN network for a long time, and increase a speed at which the terminal device goes back from the VPLMN network to camp on the HPLMN network.

In a possible design, the determining whether the terminal device enters the MCC home area specifically includes:

determining a quantity of first cells, and determining a proportion of second cells in the first cells, where the first cells are all cells that can be found currently by the terminal device, and the second cell is a cell, whose MCC is the same as an MCC corresponding to the SIM card, in the first cells; and if the proportion of the second cells in the first cells is greater than a preset proportion, determining that the terminal enters the MCC home area, where the preset proportion is not equal to zero.

A manner of determining whether the terminal device enters the MCC home area is provided to increase implementability of the solution.

In a possible design, the terminal device may determine first timing duration according to the proportion of the second cells in the first cells; set the first timing duration as timing duration of a target timer, and start timing when determining that the terminal device enters the MCC home area; and trigger the network search when a time of the target timer exceeds the first timing duration.

Preferably, in a possible design, the determining, by the terminal device, first timing duration according to a proportion of second cells in the first cells may be specifically implemented in the foregoing manner:

determining the first timing duration T1 according to the following formula:

$$T1 = 4 \times \frac{\partial}{P} + (2 - 4 \times \partial), \text{ where } \partial = \frac{P'}{1-p'},$$

P is the proportion of the second cells in the first cells, and P' is the preset proportion.

When the terminal device determines, according to a value of P, that the terminal device has entered the MCC home area, a time at which the terminal device triggers the network search may be adjusted according to the foregoing calculation formula. This can effectively prevent the terminal device from camping on the VPLMN network for a long time, and increase a speed of going back from the VPLMN network to camp on the HPLMN network.

In a possible design, if the proportion of the second cells in the first cells is less than or equal to the preset proportion, second timing duration is determined according to the proportion of the second cells in the first cells, and the second timing duration is set as duration of the target timer; and when a time of the target timer exceeds the second timing duration, the network search is triggered.

Preferably, in a possible design, the determining, by the terminal device, second timing duration according to the proportion of the second cells in the first cells may be specifically implemented in the following manner:

determining the second timing duration T2 according to the following formula:

$$T2 = \frac{P}{P'}(6 - T) + T,$$

where

T is duration corresponding to a value of a higher priority PLMN search period EF-HPPLMN field of the SIM card.

When the terminal device determines that the value of P is less than the preset value P', the terminal device may further trigger the network search according to the value of P, and dynamically adjust, according to the value of P, a time of triggering the network search, so as to effectively reduce frequent search actions of the terminal device. This can effectively prevent the terminal device from camping on the VPLMN network for a long time, and increase a speed of going back from the VPLMN network to camp on the HPLMN network.

In a possible design, the determining whether the terminal device enters the MCC home area or is to enter the MCC home area may alternatively be implemented in the following manner:

determining, according to Global Positioning System (English full name: Global Positioning System, GPS for short) positioning, whether the terminal device enters the MCC home area or is to enter the MCC home area; or determining, according to connected Wireless Fidelity (English full name: Wireless Fidelity, WIFI for short) positioning, whether the terminal device enters the MCC home area or is to enter the MCC home area.

That is, a manner of determining whether the terminal device enters the MCC home area or is to enter the MCC home area is provided to increase diversity of the solution.

In a possible design, before the determining whether the terminal device is to enter the MCC home area, the method further includes:

recording an identity of a third cell and an identity of a neighboring cell of the third cell, where the third cell is the first VPLMN cell on which the terminal device camps when entering a VPLMN area from the MCC home area; and if determining, according to the identities, that a currently camped-on cell is the third cell or the neighboring cell of the third cell, determining that the terminal device is to enter the MCC home area.

In a possible design, the triggering a network search is specifically performing the network search in a manner of triggering a higher priority PLMN search.

In a possible design, after triggering the network search, the terminal device performs the search only on networks of some standards. The networks of some standards may include at least one of the following networks:

a Global System for Mobile Communications (English full name: Global System for Mobile Communication, GSM for short) network;

a Wideband Code Division Multiple Access (English full name: Wideband Code Division Multiple Access, WCDMA for short) network; or a Long Term Evolution (English full name: Long Term Evolution, LTE for short) network.

After triggering the higher priority PLMN search, the terminal device may search only the networks of some network standards, such as the GSM network with a relatively high coverage rate. This can increase a speed at which the terminal device goes back from the VPLMN network to camp on the HPLMN network, and can further reduce power consumption of the terminal device.

According to a second aspect, an embodiment of this application provides a terminal device, where the terminal device has functions to implement actions of the terminal device in the method design of the first aspect. The functions may be implemented by hardware, or may be implemented by corresponding hardware-executed software. The hardware or software includes one or more modules that are corresponding to the foregoing functions. The modules may be software and/or hardware.

In a possible design, the terminal device includes:

a read module, configured to: when the terminal device camps on a VPLMN, determine an MCC home area corresponding to a SIM card;

a processing module, configured to: determine whether the terminal device has entered the MCC home area or is to enter the MCC home area, and if the processing module determines that the terminal device has entered the MCC home area or is to enter the MCC home area, trigger a search module to perform a network search; and the search module, configured to perform the network search according to the triggering by the processing module.

In a possible design, a structure of the terminal device includes a radio frequency module, an antenna, a bus, a memory, and a processor, where the radio frequency module, the processor, and the memory are connected by using the bus; and the processor is configured for a procedure of the method in the first aspect.

According to a third aspect, an embodiment of this application provides a computer storage medium, where the computer storage medium stores program code, and the program code is used to execute the method in the first aspect or the second aspect.

Compared with the prior art, it can be learned from the foregoing technical solutions that when the terminal device camps on the VPLMN, the MCC home area corresponding to the SIM card may be determined, and then whether the terminal device has entered the MCC home area or is to enter the MCC home area may be determined, and if the terminal device has entered the MCC home area or is to enter the MCC home area, the network search is triggered. It should be understood that when the terminal device determines that the terminal device has entered the MCC home area or is to enter the MCC home area, the network search is triggered. Compared with the prior art, in this application, when the terminal device is in a coverage area of the HPLMN, the terminal device can be effectively prevented from camping on the VPLMN for a long time, and a speed at which the terminal device goes back from the VPLMN network to camp on the HPLMN network is increased.

DESCRIPTION OF EMBODIMENTS

The embodiments of this application provide a network search method and a terminal device. The method is applied to a terminal device. A subscriber identity module SIM card is installed in the terminal device. When the terminal device camps on a VPLMN network, an MCC home area corresponding to the SIM card is determined. When it is determined that the terminal device has entered the MCC home area or is to enter the MCC home area, a network search is triggered. Compared with the prior art, in this application, when the terminal device is in a coverage area of an HPLMN network, the terminal device can be effectively prevented from camping on the VPLMN network for a long time, and a speed at which the terminal device goes back from the VPLMN network to camp on the HPLMN network is increased.

To make persons skilled in the art understand the technical solutions in this application better, the following clearly describes the technical solutions in the embodiments of this application with reference to the accompanying drawings in the embodiments of this application. Apparently, the described embodiments are merely some rather than all of the embodiments of this application. All other embodiments obtained by persons of ordinary skill in the art based on the embodiments of this application without creative efforts shall fall within the protection scope of this application.

The technical solutions in the embodiments of this application may be applied to various communications systems of a wireless cellular network, such as: a GSM system, a Code Division Multiple Access (English full name: Code Division Multiple Access, CDMA for short) system, a Wideband Code Division Multiple Access system, a general packet radio service (English full name: General Packet Radio Service, GPRS for short) system, an LTE system, a Universal Mobile Telecommunications System (English full name: Universal Mobile Telecommunications System, UMTS for short), and a future 5G communications system. This is not limited in this application.

It should be noted that the terminal device in the embodiments of this application may be a device providing voice and/or data connectivity to a user, a handheld device with a wireless connection function, or another processing device that is connected to a wireless modem. The terminal device may communicate with one or more core networks by using a radio access network (English full name: Radio Access Network, RAN for short). Terminal devices may be mobile terminals, such as a mobile phone (or referred to as "cellular" phone) and a computer with a mobile terminal, which, for example, may be a portable, pocket-sized, handheld, computer built-in, or in-vehicle mobile apparatus, and they exchange voice and/or data with the radio access network. For example, the terminal device is a device, such as a personal communication service (English full name: Personal Communication Service, PCS for short) phone, a cordless phone, a Session Initiation Protocol phone set, a wireless local loop (English full name: Wireless Local Loop, WLL for short) station, or a personal digital assistant (English full name: Personal Digital Assistant, PDA for short). The terminal device may also be referred to as user equipment (English full name: User Equipment, UE for short), a mobile station (English full name: Mobile Station, Miss. for short), a remote station (English full name: Remote Station, RS for short), a remote terminal (English full name: Remote Terminal, RT for short), an access terminal (English full name: Access Terminal, AT for short), or the like. This is not limited in this application.

It should be understood that an international mobile subscriber identity (English full name: international mobile subscriber identity, IMSI for short) is an internationally assigned number to uniquely identify a mobile subscriber. The IMSI has a total of 15 digits, and successively includes an MCC, a mobile network code (English full name: Mobile Network Code, MNC for short), and a mobile subscriber identification number (English full name: Mobile Subscriber Identification Number, MSIN for short). An MCC resource is centrally assigned and managed by the International Telecommunication Union (English full name: International Telecommunication Union, ITU for short), and is used to uniquely identify a country to which a mobile subscriber belongs, and includes a total of 3 digits. For example, China's MCC is 460, the United States' MCC is 310, and Hongkong's MCC is 454. The MCC home area described in the embodiments of this application is a country or region that is corresponding to an MCC of the SIM card installed in the terminal device. There are multiple HPLMN cells included in the MCC home area.

It should be understood that when the terminal device camps on a low priority PLMN, the terminal device needs to regularly perform a network search, that is, a higher priority PLMN search, according to a time interval specified by an EFHPPLMN of a SIM card, that is, duration of a higher priority PLMN search timer. The network search is generally performed according to a particular priority order, which is determined according to specific implementation. A higher priority search is generally performed for an HPLMN network. For example, the search is performed according to the following priority order: HPLMN>EHPLMN>user controlled PLMN (English full name: User Controlled PLMN, OPLMN for short)/operator controlled PLMN (English full name: Operator Controlled PLMN, UPLMN for short) >VPLMN. That is, a search priority for an HPLMN network is a higher network search priority.

It should be understood that when the terminal device is in a network different from the HPLMN that is corresponding to an international mobile subscriber identity of the SIM card installed in the terminal device, it indicates that the terminal device roams in a VPLMN network. Generally, for PLMNs of a same MCC of different operators, no roaming agreement is signed because of a business competition relationship. For example, a subscriber of China Mobile cannot use a network service of China Unicom, and the subscriber of China Mobile will be rejected when attempting to register with a PLMN of China Unicom. For PLMNs of different MCCs, to enable a user moving beyond coverage of an HPLMN to use a basic communications service, a roaming agreement is signed. For example, if a subscriber of China Mobile has applied for the United States and Canada roaming service, the subscriber can use a mobile communications service of a US operator. The VPLMN in the embodiments of this application is a VPLMN of an MCC different from that of the terminal device.

Figure 1:
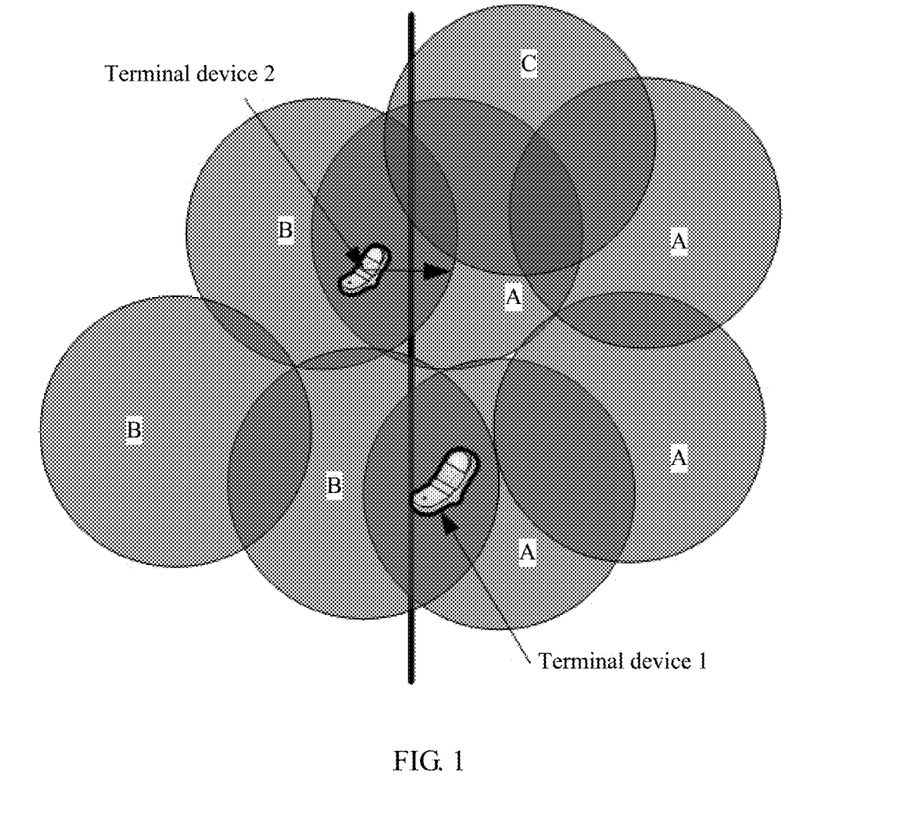
FIG. 1 is a schematic scenario diagram of a cell coverage area around a geographical border.

Referring to FIG. 1, FIG. 1 is a schematic scenario diagram of a cell coverage area around a geographical border. In FIG. 1, an area inside a circle represents a coverage area of a cell. A circle A represents an MCC home area, that is, an area covered by an HPLMN cell corresponding to a SIM card of a terminal device. A circle B represents an area covered by a VPLMN area cell. A circle C represents a coverage area of a cell of another operator. An MCC of the cell represented by the circle A is the same as an MCC of the cell represented by the circle B, but is different from an MCC of the cell represent by the circle C.

It should be understood that at a junction of regions or countries of different MCCs, that is, on a geographical border line shown in FIG. 1, although a deployment location of a base station is limited by a regional border, a signal of the base station is not limited by the border because the signal is not physical. Therefore, the terminal device located near the geographical border line can usually receive signals also from base stations of different MCCs.

As shown in FIG. 1, a terminal device 1 is on the geographical border line, and is in both the coverage area of the HPLMN cell within the MCC home area and the coverage area of the VPLMN cell. The terminal device 1 can obtain, in both of the coverage areas, a mobile communications service provided by the HPLMN cell or the VPLMN area cell. Alternatively, as shown by a terminal device 2, the terminal device 2 is in a VPLMN area and in the coverage areas of the HPLMN cell and the VPLMN cell, and the terminal device 2 can obtain a mobile communications service provided by the HPLMN cell or the VPLMN area cell.

When a coverage rate of an HPLMN network on the geographical border line is less than that of a VPLMN network, for example, in FIG. 1, the terminal device may often camp on the VPLMN network although the terminal device is in an MCC home area.

When the terminal device camps on the VPLMN network, the terminal device triggers a network search provided that the terminal device determines that the terminal device has entered the MCC home area or is to enter the MCC home area. As shown in FIG. 1, when the terminal device is in the MCC home area, it can be learned according to a network deployment characteristic that the terminal device is most likely in a coverage area of the HPLMN network. In this case, when the terminal device camps on the VPLMN network, the terminal device may trigger the network search. This can effectively avoid camping on the VPLMN network for a long time, that is, increase a speed at which the terminal device goes back from the VPLMN network to camp on the HPLMN network.

Figure 2:
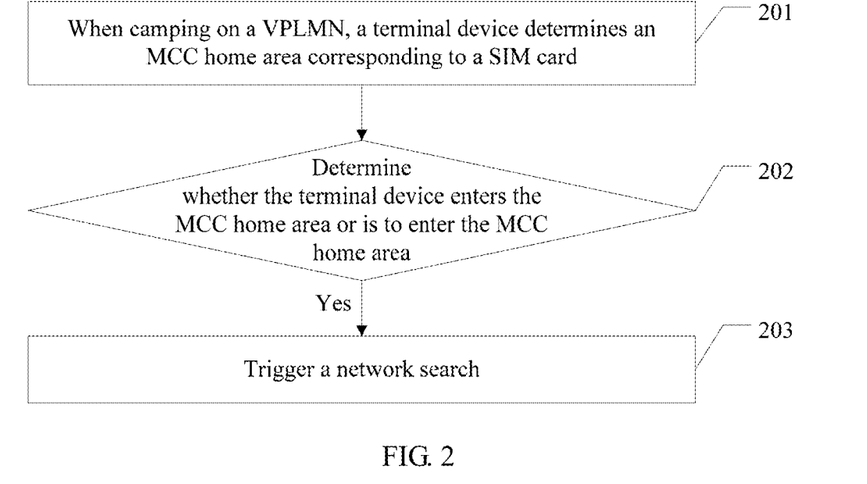
FIG. 2 is a schematic flowchart of an embodiment of a network search method according to embodiments of this application.

Referring to FIG. 2, FIG. 2 is a schematic flowchart of an embodiment of a network search method according to this application. The following steps are included.

201: When camping on a visited public land mobile network VPLMN, a terminal device determines an MCC home area corresponding to a SIM card.

When the terminal device camps on the VPLMN network, the MCC home area corresponding to the SIM card may be determined. It should be noted that the SIM card described in this embodiment of this application is a card installed in the terminal device.

Subscriber identification data, including an IMSI, is stored in the SIM card. The IMSI successively includes an MCC of a card issuance carrier, an MNC, and a mobile subscriber identification number (English full name: Mobile Subscriber Identification Number, MSIN for short). Therefore, when the SIM card is installed in the terminal device and is enabled, the MCC corresponding to the SIM card can be determined according to IMSI information recorded in the SIM card, so as to determine the MCC home area corresponding to the SIM card.

202: Determine whether the terminal device enters the MCC home area or is to enter the MCC home area.

203: Trigger a network search if the terminal device enters the MCC home area or is to enter the MCC home area.

For ease of understanding and description, whether the terminal device enters the MCC home area and whether the terminal device is to enter the MCC home area are separately described below:

1. The terminal device determines whether the terminal device enters the MCC home area. The determining may be specifically in multiple manners, which are described below separately by using specific embodiments.

Figure 3:
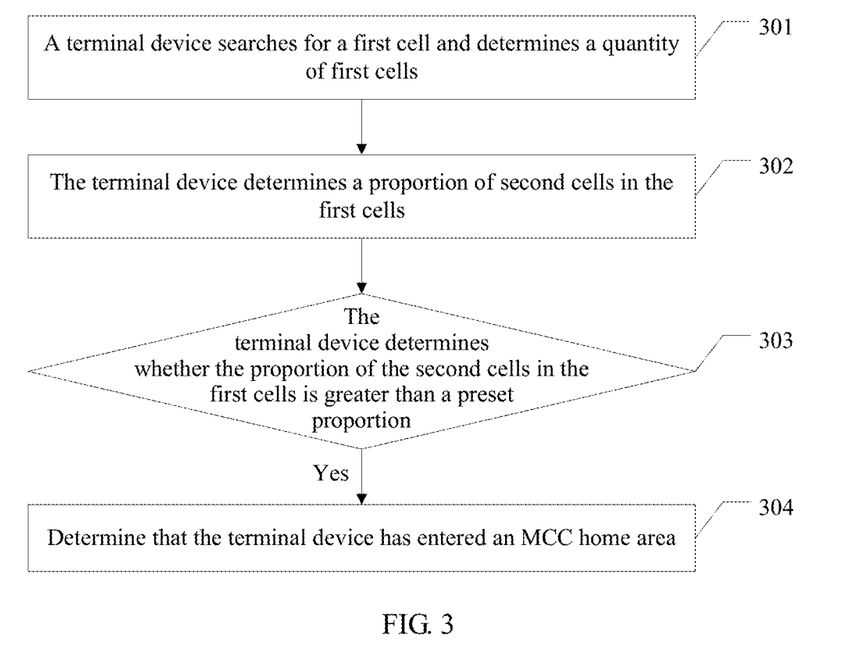
FIG. 3 is a schematic flowchart of a method of determining whether a terminal device enters an MCC home area in step 202 of FIG. 2.

FIG. 3 is a schematic flowchart of a method of determining whether the terminal device enters the MCC home area in step 202 of FIG. 2. For details, reference is made to FIG. 3.

301: The terminal device determines a quantity of first cells.

The first cells are all cells that can be found currently by the terminal device.

For example, in an example 1, if the terminal device finds three China Mobile cells, one China Telecom cell, and three cells of an operator outside China, the quantity of first cells is seven.

302: The terminal device determines a proportion of second cells in the first cells.

The second cell is a cell, whose MCC is the same as the MCC corresponding to the SIM card, in the current cells. After determining a quantity x of second cells and the quantity y of first cells, the terminal device may calculate a proportion P of the quantity of second cells in the quantity of first cells according to a formula P=x/y.

As shown in the example 1, the first cells are a sum of three China Mobile cells and one China Telecom cell, four in total.

Persons skilled in the art can know that a proportion of the second cells found, by means of network scanning by the terminal device, in all the cells has relevancy to a distance between the terminal device and a geographical border line.

It should be noted that the quantity of first cells and the quantity of second cells are recorded by the terminal device in a network search process, that is, are obtained, before step 202 of FIG. 2 of triggering the network search, in a network disconnection-triggered re-search or in a higher priority PLMN search process by the terminal device. It can be understood that a difference between the two lies in whether the terminal device camps on an original cell. The network disconnection-triggered re-search is a search performed when the terminal device no longer camps on any cell. When the higher priority PLMN search is performed, the terminal device still camps on the original cell. Camping indicates whether the terminal device can receive a paging of a network side.

303: The terminal device determines whether the proportion of the second cells in the first cells is greater than a preset proportion.

After calculating the value of P according to the formula P=x/y, the terminal device further determines whether the value of P is greater than or equal to the preset proportion P'.

304: When determining that the proportion of the second cells in the first cells is greater than the preset proportion, the terminal device determines that the terminal device has entered the MCC home area.

When determining that the value of P is greater than the preset proportion P', the terminal device determines that the terminal device enters the MCC home area.

Persons skilled in the art can know that when the terminal device is located on the geographical border line, that is, at a junction of regions or countries of different MCCs, for example, on the geographical border line shown in FIG. 1, the value of P' should be set to 0.5 when network deployment densities on both sides of the border are almost the same, and the value of P' may be set to be less than 0.5 if a network distribution density of a roaming network is higher than that of a local network. It should be noted that a specific value of P' may be set according to an actual application scenario, which is not specifically limited herein.

It can be learned from the above that according to the relevancy between the value of P and the geographical border line, when the calculated value of P indicating the proportion of the quantity of second cells is greater than P', it indicates that the terminal device is located in the MCC home area. If the calculated value of P is less than or equal to the value of P', it indicates that the terminal device is in a roaming VPLMN area, that is, the opposite side of the MCC home area. When the terminal device is in the MCC home area, the terminal device is generally in a network coverage area of a cell of a local country or local operator.

In the example 1, specifically, P' being 0.5 is used as an example for description. In the example 1, x=4 and y=7 can be obtained, and therefore, the calculated value of P is approximately equal to 0.57, and is greater than 0.5. It indicates that the terminal device enters the MCC home area, and therefore, is very likely to have been located in HPLMN coverage.

It should be noted that in some embodiments of this application, after determining that the terminal device enters the MCC home area, the terminal device may immediately trigger the network search, or trigger the network search after a preset time, for example, search for an HPLMN network in five minutes. The preset time may be set according to actual application, and is not limited herein.

Preferably, in some embodiments, first timing duration may be determined according to the value of P, and the first timing duration is set as timing duration of a target timer. The terminal device triggers the network search only when a time of the target timer expires. That is, a time at which the terminal device triggers the network search when determining that the terminal device enters the MCC home network is further limited. Specifically, the first timing duration may be determined according to the value of P in the following manner:

The terminal device may calculate the first timing duration T1 according to the following formula:

$$T1 = 4 \times \frac{\partial}{P} + (2 - 4 \times \partial), \text{ where } \partial = \frac{P'}{1 - p'}.$$

Herein, it should further be noted that in addition to the foregoing formula, T1 may also be obtained according to the value of P by using another calculation formula or in another manner. This is not limited in this application.

For example, the terminal device may determine a corresponding value of T1 by using a preset mapping list. The preset mapping list is configured in advance by the terminal device. In the preset mapping list, a mapping relationship between a value of P and T1 is stored, that is, a value of P is corresponding to a determined value of T1. The terminal device may determine corresponding T1 according to the calculated value of P by looking up the preset mapping list, and finally set the timing duration of the target timer according to the found T1.

When the terminal device camps on the VPLMN network, and the terminal device determines that the terminal device enters the MCC home area, the terminal device may dynamically adjust, according to a location relationship between the terminal device and the MCC home area, a time of triggering the network search, so as to effectively avoid camping on the VPLMN network for a long time. In addition, adjusting a search time can effectively reduce actions of frequently triggering a search by the terminal device, and reduce power consumption of the terminal device.

It should be noted that in some embodiments of this application, when the terminal device determines that the value of P is less than or equal to P', the terminal device may determine second timing duration according to the value of P, and set the second timing duration as duration of the target timer.

That is, when the terminal device determines that the value of P is less than or equal to P', the terminal device may alternatively set the duration of the target timer according to the value of P. The terminal device triggers the network search only when a time of the target timer exceeds the second timing duration. Specifically, the second timing duration may be determined according to the value of P in the following manner:

The terminal device calculates the second timing duration T2 according to the following formula:

$$T2 = \frac{P}{P'}(6-T)+T,$$

where T is duration corresponding to a value of a higher priority PLMN search period EF-HPPLMN field of the SIM card.

It should be noted that in some embodiments of this application, herein the preset proportion P' is assumed to be 0.5, and when the calculated value of P is less than 0.5, persons skilled in the art can know that in this case, the terminal device is located in the VPLMN area. The value of P is related to the distance between the terminal device and the geographical border line. A smaller value of P indicates that the terminal device can find fewer cells of the MCC home area. Therefore, when the value of P calculated by the terminal device is less than 0.5, that is, less than the preset proportion P', the terminal may further determine the search time according to a specific value of P.

For example, in a case of 0.2<P<0.5, the terminal device sets the duration of the target timer according to the second timing duration T2, and triggers the network search only when the time of the target timer expires. It should be understood that within this range, although the terminal device is located in the VPLMN area, the terminal device is nearer to the geographical border line. In this case, the terminal device sets the timing duration of the target timer according to T2. This shortens a search triggering time, and increases a speed at which the terminal device goes back from the VPLMN network to camp on the HPLMN network.

In another case of P≤0.2, the terminal device triggers the network search according to an existing protocol, that is, triggers the network search according to timing duration that is set according to duration corresponding to the value of the EF-HPPLMN field of the SIM card. It should be understood that within this range, although the terminal device is located in the VPLMN area, compared with the case of 0.2<P<0.5, the terminal device is farther from the geographical border line, and can find fewer cells of the MCC home area. In this case, there a higher probability of being covered by the VPLMN area cell, and the terminal device may trigger the network search according to the existing protocol, without shortening or prolonging a search triggering time. This ensures that the terminal device can go back to camp on the HPLMN network, and can also reduce power consumption of the terminal device.

Similarly, it should be understood that when the terminal device determines that the value of P is less than or equal to P', T2 may be further calculated according to the value of P in another calculation manner different from the foregoing formula, which is not specifically limited herein.

The terminal device may further determine, in any one or a combination of the following manners other than according to the value of P, whether the terminal device is located in the MCC home area:

Manner 1: The terminal device may determine, according to Global Positioning System (English full name: Global Positioning System, GPS for short) positioning, whether the terminal device enters the MCC home area.

When the terminal device is connected to a network and a data service is available, the terminal device may download latitude and longitude data of the geographical border line from a server, so as to determine whether the terminal device is located in the MCC home area. For example, when differences between latitude and longitude of a location of the terminal device and latitude and longitude of the geographical border line are within a preset range, it indicates that the terminal device is located in the MCC home area.

Manner 2: The terminal device may determine, according to connected Wireless Fidelity (English full name: WIreless-FIdelity, WIFI for short) positioning, whether the terminal device enters the MCC home area. For example, the terminal device may learn, in a manner of preconfiguration, obtaining from a server, or auto-learning, whether a WiFi hotspot is located in the MCC home area.

For ease of understanding, auto-learning is used as an example for description:

When the terminal device is connected to or finds, by means of scanning, a WiFi hotspot A, the terminal device also camps on the HPLMN network. When the terminal device is connected to or finds, by means of scanning, a WiFi hotspot B, the terminal device camps on the VPLMN network. In this case, the terminal device saves related information about the hotspot A and the hotspot B, and defines the hotspot A as a WiFi hotspot in the MCC home area. Then, when the terminal device camps on the VPLMN network but is connected to or finds, by means of scanning, the WiFi hotspot A, the terminal device determines that the terminal device enters the MCC home area.

Herein, it should be noted that in some embodiments of this application, when a WiFi hotspot connected by the terminal device, for example, a WiFi hotspot C connected by the terminal device is not located in the MCC home area, but located in the VPLMN area, it indicates that the terminal device is most likely in the VPLMN area. In this case, the terminal device will most likely not leave the VPLMN area in a period of time. Therefore, when the terminal device is still in a coverage area of the hotspot C, the terminal device does not trigger the network search.

It should be noted that the terminal device may determine, in the aforementioned GPS positioning manner or WiFi positioning manner, whether the terminal device enters the MCC home area, and may alternatively determine, in another manner, whether the terminal device is located in the MCC home area, for example, the terminal device may determine, in a base station positioning manner, whether the terminal device is located in the MCC home are, which is not specifically limited herein.

It should be noted that in some embodiments of this application, when the terminal device determines that the value of P is equal to 0, the terminal device conducts execution according to an existing protocol, that is, triggers the network search according to the timing duration that is set according to the duration corresponding to the value of the EF-HPPLMN field of the SIM card.

The target timer in the foregoing embodiment may be an individual timer, or may be a higher priority PLMN search timer, which is not specifically limited herein. It should be understood that if the target timer is the higher priority PLMN search timer, correspondingly, the triggering a network search is performing the network search in a manner of triggering a higher priority PLMN search.

Figure 4:
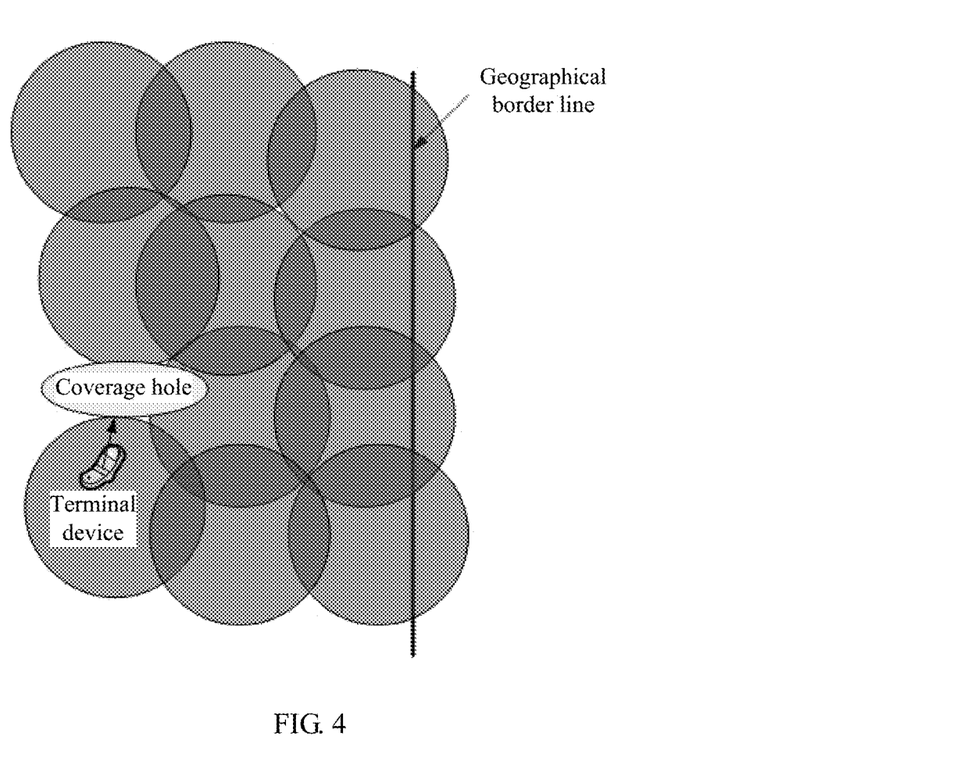
FIG. 4 is a schematic scenario diagram of a cell coverage area in a VPLMN border area.

In some embodiments of this application, the triggering a network search may be further implemented in the following manner:

As shown in FIG. 4, circles in FIG. 4 are cell coverage in a VPLMN border area. It should be understood that ideal coverage areas of deployed network cells should be contiguous, and there is no coverage hole between the coverage areas of the cells. In buildings, suburbs, or a place not easy to deploy a base station on a network side, the coverage hole may exist. As shown in an oval area in the figure, the oval area is a place in which the terminal device cannot receive a network signal. When the terminal device is located in coverage of a VPLMN cell, the network side informs the terminal device of another cell in the nearby, which is generally a cell whose coverage area overlaps that of the VPLMN cell, that is, a neighboring cell. Then, the terminal device may camp on a corresponding cell, so that the terminal device is seamlessly handed over between cells. When a mobile phone moves across a geographical border line or enters a coverage hole, however, there is no neighboring cell whose signal is stronger than that of a current cell. In this case, the terminal device triggers the network search. This method is to initiate a search by using this feature, because when the foregoing case applies, the terminal device is most likely located in a geographical border.

It can be understood that in an application scenario shown in FIG. 4, the value of P calculated by the terminal device may be equal to 0.

It should be noted that in some embodiments of this application, when the value of P calculated by the terminal device is equal to 0, it indicates that the terminal device is located in a coverage hole. In this case, the terminal device may record a cell that is found after a search is triggered, and when the terminal device enters the cell again next time, the terminal device does not trigger the network search.

It should be noted that in some embodiments of this application, when the terminal device camps on the VPLMN and camping duration reaches preset duration, even if determining that the value of P is not equal to 0, the terminal device does not trigger the network search according to a triggering time calculated according to the value of P, but trigger the network search according to preset timing duration of the higher priority PLMN search timer.

It should be noted that in actual application, specific preset duration may be chosen according to actual application, which is not specifically limited herein.

It can be learned from the foregoing technical solutions that compared with the prior art, in this application, the terminal device may determine the MCC corresponding to the SIM card installed in the terminal device, and further determine whether the terminal device enters the MCC home area. That is, when the terminal device determines that the terminal device is located in the MCC home area, the HPLMN network is searched for. That is, when the terminal device camps on the VPLMN network, the network search is triggered provided that the terminal device determines that the terminal device is located in the MCC home area.

When the terminal device is in an HPLMN coverage area, the terminal device can be effectively prevented from camping on the VPLMN network for a long time.

2. The terminal device determines whether the terminal device is to enter the MCC home area. The determining may be specifically in multiple manners, which are described below separately.

Figure 5:
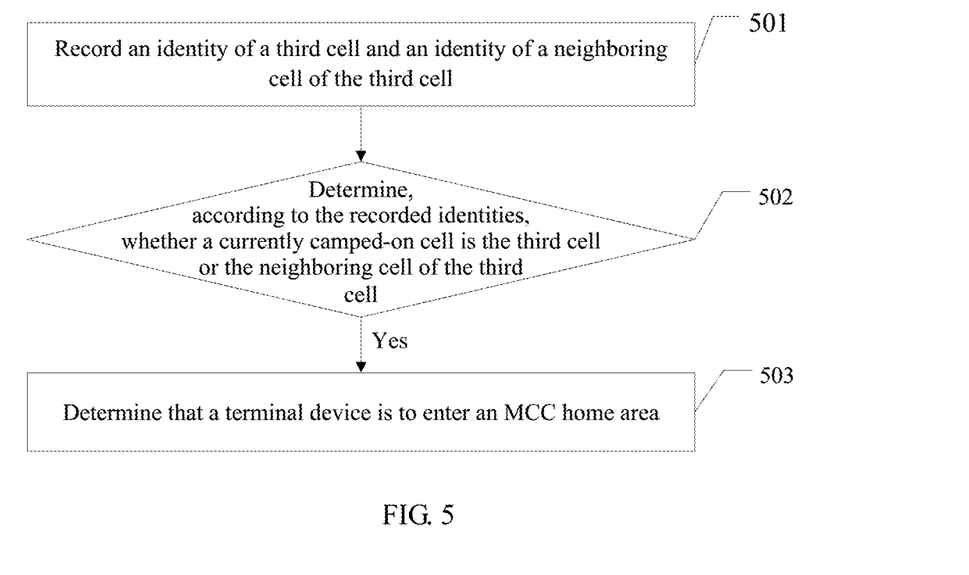
FIG. 5 is a schematic flowchart of a method of determining whether a terminal device is to enter an MCC home area in step 202 of FIG. 2.

FIG. 5 is a schematic flowchart of a method of determining whether the terminal device is to enter the MCC home area in step 202 of FIG. 2. As shown in FIG. 5, the method includes the following steps.

501: Record an identity of a third cell and an identity of a neighboring cell of the third cell.

The identity of the third cell and the identity of the neighboring cell of the third cell may be recorded in the terminal device. It should be understood that each cell has its own specific cell identity, that is, a cell-ID. The third cell is the first VPLMN cell on which the terminal device camps when entering a VPLMN area from the MCC home area.

502: Determine, according to the recorded identities, whether a currently camped-on cell is the third cell or the neighboring cell of the third cell.

503: If determining that the currently camped-on cell is the third cell or the neighboring cell of the third cell, determine that the terminal device is to enter the MCC home area.

For ease of understanding and description, the following describes with reference to the accompanying drawings.

Figure 6:
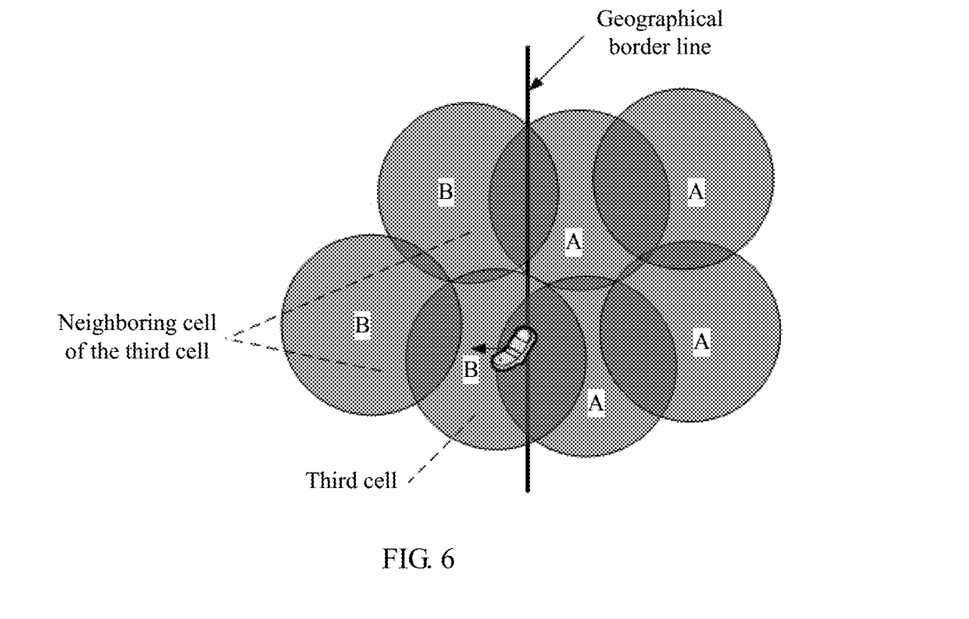
FIG. 6 is another schematic scenario diagram of a cell coverage area around a geographical border.

Referring to FIG. 6, FIG. 6 is another schematic scenario diagram of a cell coverage area around a geographical border. It can be understood that according to network deployment characteristics of a border area, the third cell and the neighboring cell of the third cell most likely have an overlapping area with a cell of the MCC home area. An area inside a circle B represents a coverage area of a VPLMN area cell. An area inside a circle A represents a coverage area of a cell in the MCC home area. After leaving the coverage area of the cell in the MCC home area, entering the coverage area of the VPLMN area cell, and camping on the VPLMN network, the terminal device may record an identity of the first camped-on cell and an identity of a neighboring cell of the first camped-on cell, that is, record the identity of the third cell and the identity of the neighboring cell of the third cell.

Figure 7:
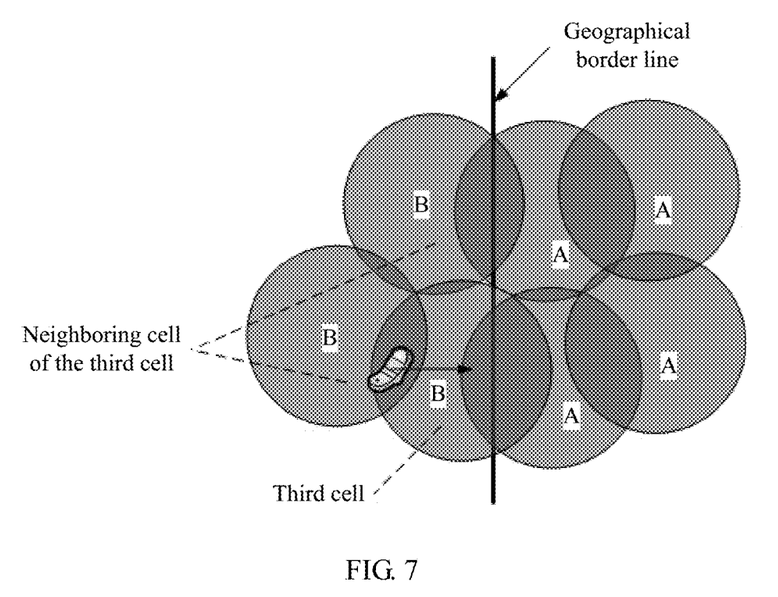
FIG. 7 is another schematic scenario diagram of a cell coverage area around a geographical border.

In a process in which the terminal device returns to the HPLMN network from the VPLMN network, if the terminal device camps on any one ever-recorded cell, that is, when the terminal device camps on the recorded third cell or the recorded neighboring cell of the third cell, a higher priority PLMN search may be triggered. As shown in FIG. 7, FIG. 7 is another schematic scenario diagram of a cell coverage area around a geographical border. When the terminal device camps on the third cell, the terminal device may immediately trigger the network search, or wait until a preset time elapses and then trigger the network search.

When entering the VPLMN area from the MCC home area, the terminal device may record the first camped-on VPLMN cell and the neighboring cell of the first camped-on VPLMN cell. When the terminal device stays in the VPLMN cell for a preset time, for example, after the terminal device roams for six hours and when the terminal device camps on any one ever-recorded cell, the terminal device determines that the terminal device is to enter the MCC home area, and trigger the network device. This effectively avoids camping on the VPLMN network for a long time, that is, increases a speed at which the terminal device goes back from the VPLMN network to camp on the HPLMN network.

It should be noted that in the foregoing several embodiments, after the terminal device triggers the network search, the terminal device may perform the network search only on networks of some standards. The networks of some standards may include at least one of the following networks: for example, a GSM network, a WCDMA network, or an LTE network. The LTE network may be specifically a time division Long Term Evolution (English full name: Time Division Long Term Evolution, TD-LTE for short) network or a frequency-division duplex Long Term Evolution (English full name: Frequency Division Duplex Long Term Evolution, FDD-LTE for short) network.

It should be noted that the networks of some standards may further include a UMTS network, a CDMA network, or the like, which is not specifically limited herein.

After triggering the network search, the terminal device may search only the networks of some network standards, such as the GSM network with a relatively high coverage rate. This increases a speed at which the terminal device goes back from the VPLMN network to camp on the HPLMN network, and can further reduce power consumption of the terminal device.

In addition, it should be noted that in some embodiments of this application, a time interval between every two times of network search triggering performed by the terminal device in this embodiment of this application is greater than or equal to T3, that is, greater than or equal to the duration corresponding to the value of the EF-HPPLMN field of the SIM card. It should be understood that when the terminal camps on the VPLMN network and goes back to camp on the HPLMN network in the manner of the foregoing embodiment, and when the terminal device camps on the VPLMN network again and the terminal triggers the network search in the manner provided in the foregoing embodiment, an interval between the two times of network search triggering should be greater than or equal to T3. In actual application, this can effectively reduce actions of frequently triggering a search, and can reduce power consumption of the terminal device.

The network search method in the embodiments of this application is described above. A terminal device in the embodiments of this application is described below.

Figure 8:
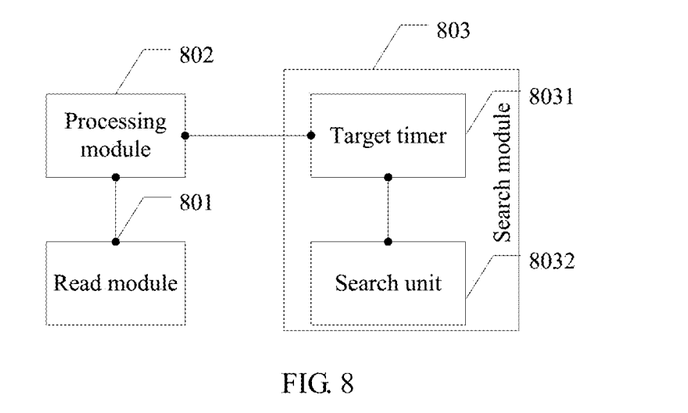
FIG. 8 is a schematic structural diagram of a terminal device according to an embodiment of this application.

For details, reference is made to FIG. 8. FIG. 8 is a schematic structural diagram of a terminal device according to an embodiment of this application. The terminal device includes a read module 801, a processing module 802, and a search module 803.

The read module 801 is configured to: when the terminal device camps on a VPLMN, determine an MCC home area corresponding to a SIM card.

The processing module 802 is configured to: determine whether the terminal device has entered the MCC home area or is to enter the MCC home area, and if the processing module 802 determines that the terminal device has entered the MCC home area or is to enter the MCC home area, trigger the search module 803 to perform a network search.

The search module 803 is configured to perform the network search according to the triggering by the processing module 802.

In a possible design, the terminal module further includes the search module 803, which is further configured to:

determine a quantity of first cells, where the first cells are all cells that can be found currently by the terminal device; and the processing module 802 is further configured to:

determine a proportion of second cells in the first cells, where the second cell is a cell, whose MCC is the same as an MCC corresponding to the SIM card, in the first cells; and if the processing module 802 determines that the proportion of the second cells in the first cells is greater than a preset proportion, determine that the terminal enters the MCC home area, where the preset proportion is not equal to zero.

In a possible design, the search module 803 includes a target timer 8031 and a search unit 8032;

the processing module 802 is further configured to:

determine first timing duration according to the proportion of the second cells in the first cells, and set the first timing duration as timing duration of the target timer; and the target timer 8031 is configured to: start timing when it is determined that the terminal device enters the MCC home area, and when a time of the target timer 8031 exceeds the first timing duration, instruct the search unit 8032 to perform the network search.

It should be noted that for other functions of or steps performed by the foregoing modules, reference may be made to corresponding steps or functions of the terminal device in the foregoing method embodiment, and details are not repeated herein.

Figure 9:
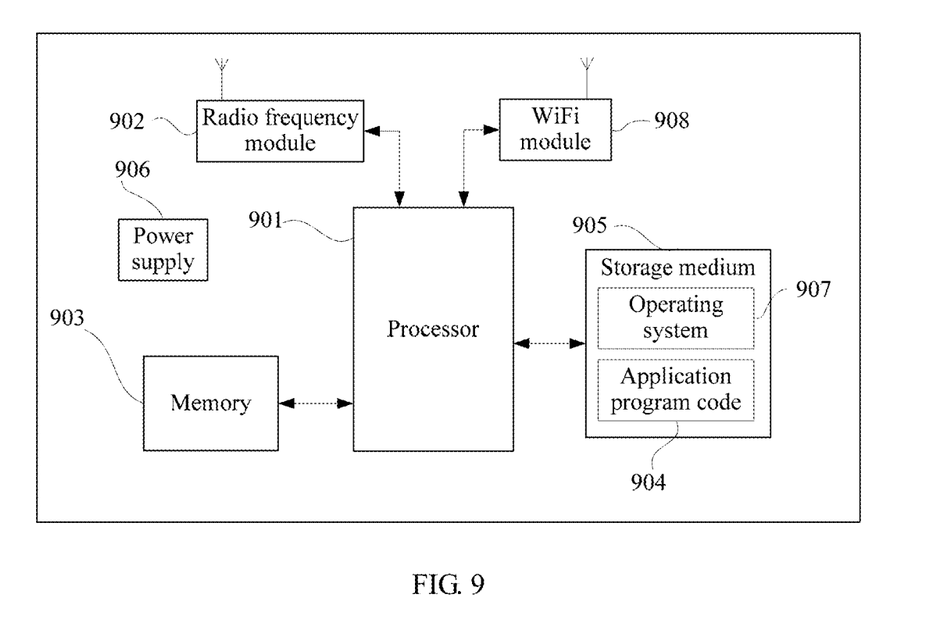
FIG. 9 is another schematic structural diagram of a terminal device according to an embodiment of this application.

The terminal device in this embodiment of this application is described above from a perspective of a modular function. The terminal device in this embodiment of this application is described below from a perspective of hardware processing. Referring to FIG. 9, FIG. 9 is another schematic structural diagram of a terminal device according to an embodiment of this application.

It should be noted that the terminal device may further include, for example, an entity device processor 901 (for example, at least one processor), a radio frequency module 902, and a memory 903 that are corresponding to the read module 801, the processing module 802, and the search module 803, respectively, according to one or more of the foregoing embodiments, and at least one storage medium 905 (for example, at least one mass storage module) that stores program code 904. The memory 903 and the storage medium 905 may be a temporary storage or a permanent storage. A program stored in the storage medium 905 may include at least one module (which is not shown in the figure), and each module may include a series of instruction operations in the terminal device. Still further, the central processing unit 901 may be configured to communicate with the storage medium 905, and perform, on the terminal device, the series of instruction operations in the storage medium 905.

The terminal device may further include components such as at least one power supply 906, at least one operating system 907, and a WiFi module 908. Persons skilled in the art can understand that a terminal device structure shown in FIG. 9 does not constitute a limitation on the terminal device, and the terminal device may include more or fewer components than those shown in the figure, or a combination of some components, or components disposed differently. No limitation is imposed thereon in this application.

Steps performed by or functions of the terminal device in this embodiment of this application may be based on the schematic structural diagram of the terminal device shown in FIG. 8. For details, reference may be made to a corresponding process in the foregoing embodiment, and details are not repeated herein.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present invention described herein can be implemented in other orders than the order illustrated or described herein. Moreover, the terms "include" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It should be noted that the processor in the foregoing apparatus embodiment may be a central processing unit (central processing unit, CPU for short), a network processor (network processor, NP for short), or a combination of a CPU and an NP. The processor may further include a hardware chip, which may be specifically an application-specific integrated circuit (application-specific integrated circuit, ASIC for short), a programmable logic device (programmable logic device, PLD for short), or a combination thereof. Additionally, the PLD may be a complex programmable logic device (complex programmable logic device, CPLD for short), a field-programmable gate array (field-programmable gate array, FPGA for short), a generic array logic (generic array logic, GAL for short), or any combination thereof. No limitation is imposed thereon in this application.

In the several embodiments provided in this application, it should be understood that the disclosed system, module, and method may be implemented in other manners. For example, the described apparatus embodiment is merely an example. For example, the module division is merely logical function division and may be other division in actual implementation. For example, multiple units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional modules in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated module is implemented in the form of a software functional unit and sold or used as an independent product, the integrated module may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A network search method, wherein the method is applied to a terminal device, a subscriber identity module (SIM) card is installed in the terminal device, and the method comprises:
    when the terminal device camps on a visited public land mobile network (VPLMN), determining a mobile country code (MCC) home area corresponding to the SIM card;
    determining whether the terminal device has entered the MCC home area or is to enter the MCC home area, wherein the determining whether the terminal device has entered the MCC home area comprises:
        determining a quantity of first cells, wherein the first cells are all cells that can be found currently by the terminal device;
        determining a proportion of second cells in the first cells, wherein each second cell is a cell, whose MCC is the same as an MCC corresponding to the SIM card, in the first cells; and
        if the proportion of the second cells in the first cells is greater than a preset proportion, determining that the terminal device has entered the MCC home area, wherein the preset proportion is not equal to zero; and
    triggering a network search if the terminal device has entered the MCC home area or is to enter the MCC home area.

2. The network search method according to claim 1, wherein the triggering a network search comprises:
    determining first timing duration according to the proportion of the second cells in the first cells;
    setting the first timing duration as timing duration of a target timer, and starting timing when determining that the terminal device enters the MCC home area; and
    triggering the network search when a time of the target timer exceeds the first timing duration.

3. The network search method according to claim 2, wherein the determining first timing duration according to the proportion of the second cells in the first cells comprises:
    determining the first timing duration T1 according to the following formula:

$$T1 = 4 \times \frac{\partial}{P} + (2 - 4 \times \partial), \text{ wherein } \partial = \frac{P'}{1-p'},$$

P is the proportion of the second cells in the first cells, and P' is the preset proportion, wherein P' is less than 1.

4. The network search method according to claim 2, wherein the method further comprises:
    if the proportion of the second cells in the first cells is less than or equal to the preset proportion, determining second timing duration according to the proportion of the second cells in the first cells;

setting the second timing duration as duration of the target timer; and triggering the network search when a time of the target timer exceeds the second timing duration.

5. The network search method according to claim 4, wherein the determining second timing duration according to the proportion of the second cells in the first cells comprises:

determining the second timing duration T2 according to the following formula:

$$T2 = \frac{P}{P'}(6 - T) + T,$$

wherein T is duration corresponding to a value of a higher priority PLMN search period Elementary File-Higher Priority PLMN search period (EF-HPPLMN) field of the SIM card, P is the proportion of the second cells in the first cells, and P' is the preset proportion.

6. The network search method according to claim 1, before the determining whether the terminal device is to enter the MCC home area, further comprising:

recording an identity of a third cell and an identity of a neighboring cell of the third cell, wherein the third cell is the first VPLMN cell on which the terminal device camps when entering a VPLMN area from the MCC home area; and if determining, according to the identities, that a currently camped-on cell is the third cell or the neighboring cell of the third cell, determining that the terminal device is to enter the MCC home area.

7. The network search method according to claim 1, wherein the triggering a network search comprises:

performing the network search in a manner of triggering a higher priority PLMN search.

8. A terminal device, comprising:

a transmitter, an antenna, a bus, at least one processor, and a memory, wherein:

the transmitter, the at least one processor, and the memory are connected by using the bus;

the antenna is connected to the transmitter; and the memory is configured to store an instruction, and the at least one processor is configured to execute the instruction stored in the memory, so that the terminal device executes the processing method comprising:

when the terminal device camps on a visited public land mobile network (VPLMN), determining a mobile country code (MCC) home area corresponding to a subscriber identity module (SIM) card installed in the terminal device;

determining whether the terminal device has entered the MCC home area or is to enter the MCC home area, wherein the determining whether the terminal device has entered the MCC home area comprises:

determining a quantity of first cells, wherein the first cells are all cells that can be found currently by the terminal device;

determining a proportion of second cells in the first cells, wherein each second cell is a cell, whose MCC is the same as an MCC corresponding to the SIM card, in the first cells; and if the proportion of the second cells in the first cells is greater than a preset proportion, determining that the terminal device has entered the MCC home area, wherein the preset proportion is not equal to zero; and triggering a network search if the terminal device has entered the MCC home area or is to enter the MCC home area.

* * * * *